US012562635B2

(12) United States Patent
Debosque et al.

(10) Patent No.: US 12,562,635 B2
(45) Date of Patent: Feb. 24, 2026

(54) SIGNALING OPEN DRAIN READBACK FOR FUNCTIONAL SAFETY (FUSA) APPLICATIONS IN POINT OF LOAD (POL) INTEGRATED CIRCUIT

(71) Applicant: SEMICONDUCTOR COMPONENTS INDUSTRIES, LLC, Scottsdale, AZ (US)

(72) Inventors: Philippe Debosque, Toulouse (FR); Dieter Jozef Joos, Nieuwenrode (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 308 days.

(21) Appl. No.: 18/349,273

(22) Filed: Jul. 10, 2023

(65) Prior Publication Data

US 2024/0356433 A1      Oct. 24, 2024

Related U.S. Application Data

(60) Provisional application No. 63/497,319, filed on Apr. 20, 2023.

(51) Int. Cl.
*H02M 1/32*          (2007.01)
*H02M 3/155*        (2006.01)

(52) U.S. Cl.
CPC ............. *H02M 1/32* (2013.01); *H02M 3/155* (2013.01)

(58) Field of Classification Search
CPC ...... H02M 1/008; H02M 1/32; H02H 1/0061; G05F 1/577
See application file for complete search history.

(56) References Cited

U.S. PATENT DOCUMENTS

| | | | |
|---|---|---|---|
| 8,086,874 B2 | 12/2011 | Chapuis et al. | |
| 2010/0325325 A1* | 12/2010 | Fernald | H02M 3/1584 |
| | | | 710/110 |
| 2013/0321967 A1* | 12/2013 | Muneyasu | H02H 3/00 |
| | | | 361/88 |

OTHER PUBLICATIONS

Valdez, J., & Becker, J. (2015, June). Ti. Understanding the I2C Bus. https://www.ti.com/lit/pdf/slva704 (Year: 2015).*

* cited by examiner

*Primary Examiner* — Alex Torres-Rivera
*Assistant Examiner* — Ularislao Cordova
(74) *Attorney, Agent, or Firm* — Dickinson Wright PLLC

(57)          ABSTRACT

Signaling open drain read back for functional safety (FUSA) applications in point of load (POL) integrated circuit. Example embodiments include methods of operating a point of load (POL) device, including: supplying power to a load via a power terminal; selectively conducting, by a field-effect transistor (FET), a current between a signal output terminal of the POL power supply device and a ground terminal of the POL power supply device to drive the signal output terminal to a low-voltage state, thereby communicating a signal; and detecting, by a monitoring circuit in the POL power supply, a status of the signal output terminal to determine whether an external device is communicating the signal on a shared communications line connected to the signal output terminal.

20 Claims, 5 Drawing Sheets

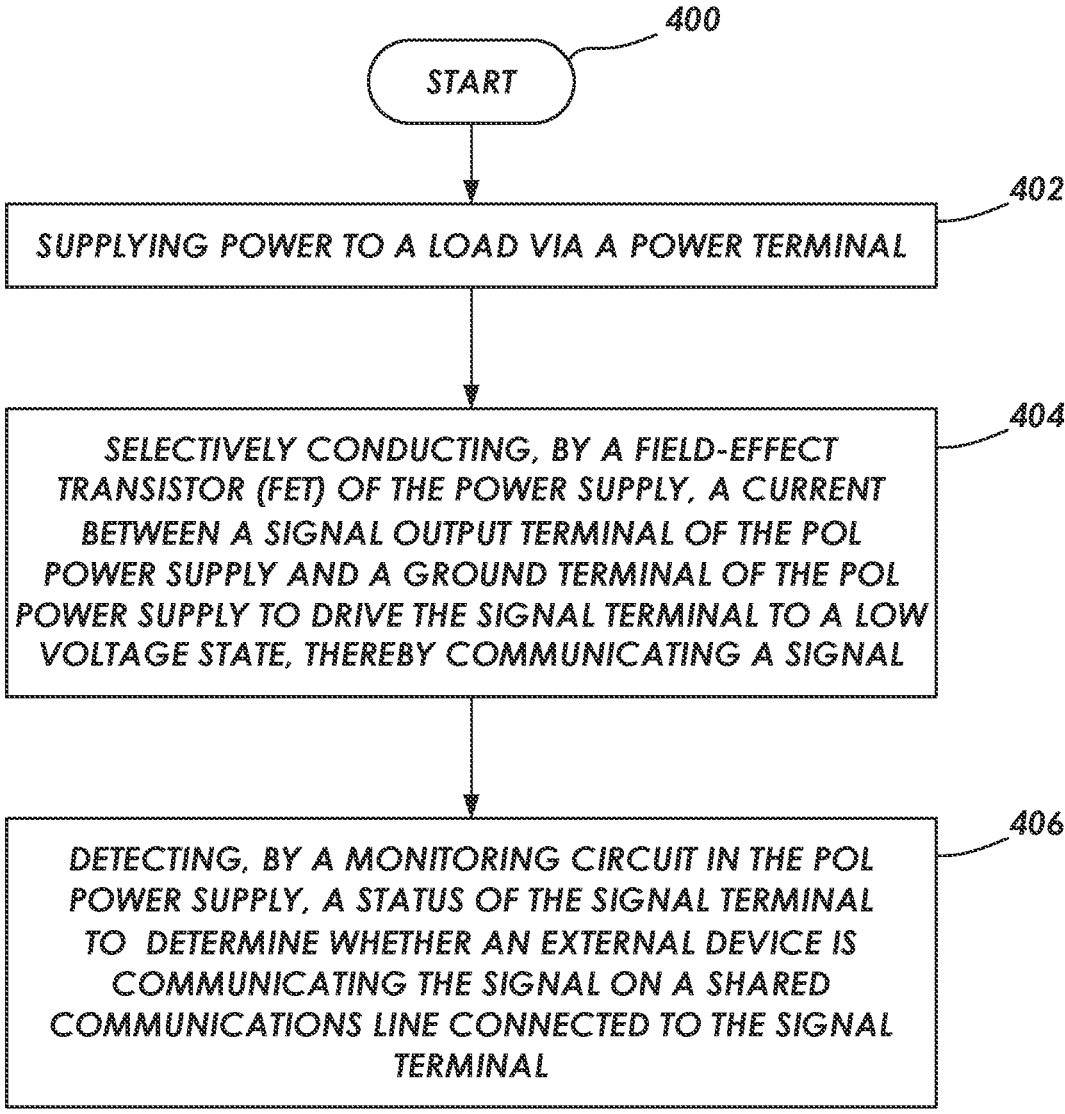

*FIG. 5*

START ⟵ 400

SUPPLYING POWER TO A LOAD VIA A POWER TERMINAL ⟵ 402

SELECTIVELY CONDUCTING, BY A FIELD-EFFECT TRANSISTOR (FET) OF THE POWER SUPPLY, A CURRENT BETWEEN A SIGNAL OUTPUT TERMINAL OF THE POL POWER SUPPLY AND A GROUND TERMINAL OF THE POL POWER SUPPLY TO DRIVE THE SIGNAL TERMINAL TO A LOW VOLTAGE STATE, THEREBY COMMUNICATING A SIGNAL ⟵ 404

DETECTING, BY A MONITORING CIRCUIT IN THE POL POWER SUPPLY, A STATUS OF THE SIGNAL TERMINAL TO  DETERMINE WHETHER AN EXTERNAL DEVICE IS COMMUNICATING THE SIGNAL ON A SHARED COMMUNICATIONS LINE CONNECTED TO THE SIGNAL TERMINAL ⟵ 406

SIGNALING OPEN DRAIN READBACK FOR FUNCTIONAL SAFETY (FUSA) APPLICATIONS IN POINT OF LOAD (POL) INTEGRATED CIRCUIT

CROSS-REFERENCE TO RELATED APPLICATIONS

This U.S. Patent application claims the benefit of and priority to U.S. Provisional Patent Application No. 63/497,319, filed Apr. 20, 2023, titled "Signaling Open Drain Readback for Functional Safety (FUSA) Applications in Point of Load (PoL) Integrated Circuit", which is incorporated by reference herein in its entirety.

BACKGROUND

Vehicles, such as passenger cars and trucks, may include several different electrical systems to perform various different functions. Many such electrical systems include data-fusion or data-processing system-on-chip (SoC) devices.

Data-fusion or data-processing SoCs may include many supply rails, at least some of which may be safety critical. For example, dedicated power up and power down should be respected for reliability, and tolerance of voltages on the rails must be monitored to guarantee computing integrity. Both can impact the functional safety (FUSA) of the SoC and the corresponding electrical systems. Any deviations from specified values must be detected and, depending on the system, specific actions must be performed to set the system in a safe state (e.g. initiate power down, or set signaling pin to predefined level).

To supply the SoC supply rails, a Power Management Integrated Circuit (PMIC) is often used that is able to control and diagnose the supply rails, detect any deviations from the specified values, and finally signal and set the platform in a safe state.

Some applications may use two or more stand-alone Point of Load (POL) devices instead of a PMIC to supply those rails. Such POL power supply devices may be more flexible and require less software than PMIC devices. However, stand-alone POL power supplies have no central safety controller, as is provided in a PMIC.

BRIEF DESCRIPTION OF THE DRAWINGS

For a detailed description of example embodiments, reference will now be made to the accompanying drawings in which:

FIG. 5 shows a flow chart listing method steps in accordance with at least some embodiments.

DEFINITIONS

Figure 1:
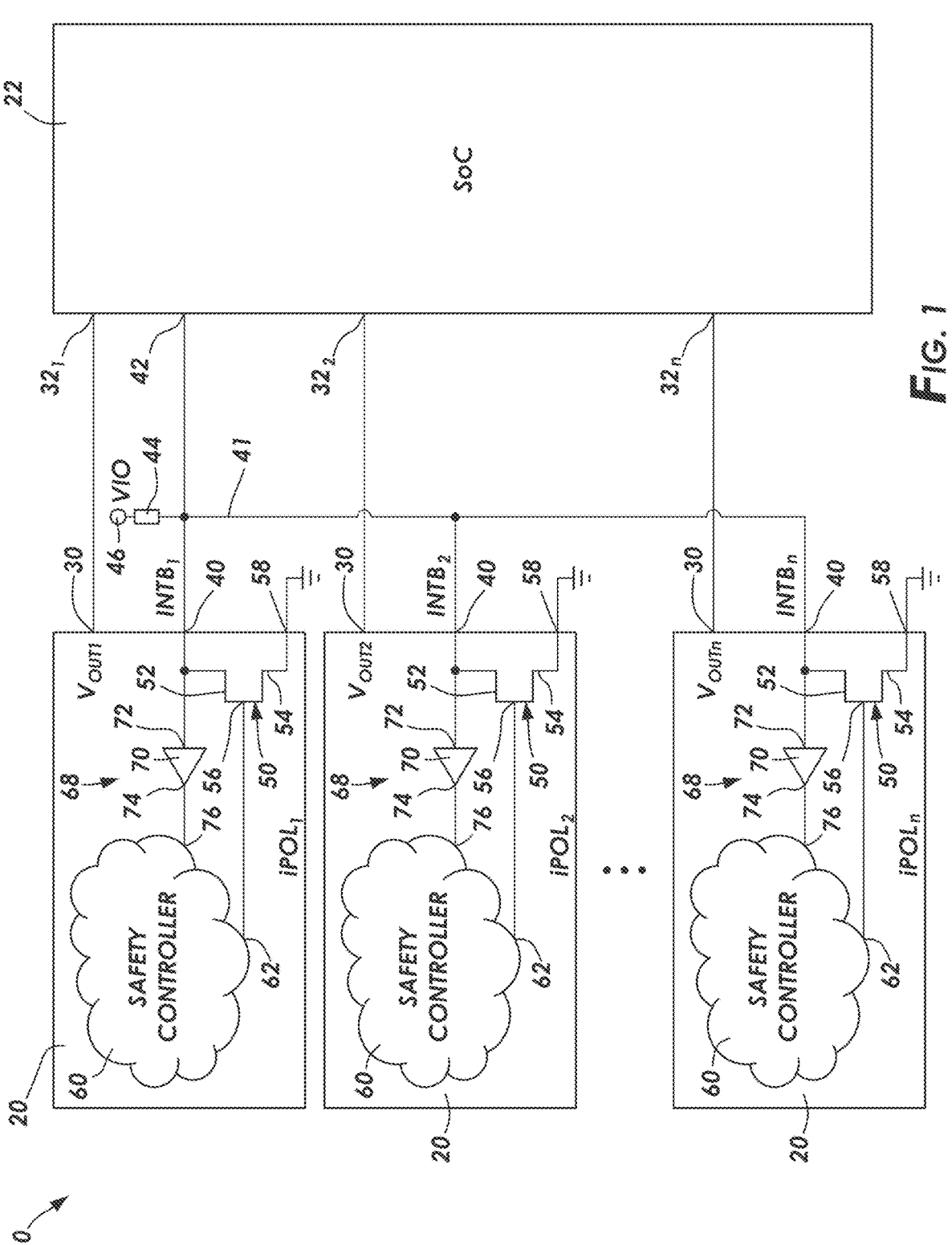
FIG. 1 shows an electrical schematic of a first power supply circuit including several first point of load (POL) power supply devices each connected to a System-on-Chip (SoC) device.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to point of load (POL) power supply devices, which may be called POL power supplies or intelligent POL (iPOL) devices, and power supply circuits including such POL power supplies. The present disclosure provides a link between a stand-alone POL power supply device and one or more external devices, such as additional POL power supply devices, which may enable maintaining a safety level of the system without an external safety controller. The example embodiments may each use an open drain configuration to connect the POL power supply and one or more external devices via a shared communications line.

The example embodiments may each implement a bidirectional Open Drain Signaling arrangement to provide read back monitoring of a signal terminal connected to the shared communications line. Each of the POL power supplies may, therefore, detect if another device connected to the shared communications line is communicating a signal, such as driving the shared communications line to a low-voltage configuration. Each of the POL power supplies may, therefore, take an appropriate action based on detecting another device communicating a signal via the shared communications line.

FIG. 1 shows a first power supply circuit 10 including a plurality of first POL power supplies 20 each connected to a load device and configured to supply power thereto. The load device illustrated in FIG. 1 includes a System-on-Chip (SoC) device 22. However, the principles of the present disclosure may be applied to POL power supplies for supplying power to one or more different types of load devices in addition to or instead of the SoC device 22, such as other SoC devices, microprocessors, microcontrollers, ASICs, communications devices, or other types of electrical devices.

The first power supply circuit 10 includes an open drain configuration to connect the plurality of first POL power supplies 20 to a first shared communications line 41.

Each of the first POL power supplies 20 includes a power terminal 30, and the first POL power supplies 20 are each configured to energize a corresponding one of the output terminals 30 with a corresponding output voltage $V_{OUT1}$, $V_{OUT2}$, $V_{OUTN}$ for supplying power to a load. The output terminals 30 of the first POL power supplies 20 are each connected to a corresponding power input terminal $32_1$, $32_2$, $32_n$ of the SoC device 22 for supplying power thereto.

Each of the first POL power supplies 20 also includes a first signal output terminal 40, and the first POL power supplies 20 are each configured to selectively conduct current between the first signal output terminal 40 and a ground terminal 58 having a ground potential for selectively driving the first shared communications line 41 to a low-voltage state, and thereby communicating a signal to the SoC device 22. The signal communicated on the first shared communications line 41 may include an interrupt signal, such as a B-interrupt INTB, which may indicate an error condition related to the first POL power supply 20, such as a corresponding one of the output terminals 30 having an overloaded condition. The low-voltage state may include the first shared communications line 41 having a voltage below a predetermined low threshold voltage to indicate the signal.

The first power supply circuit 10 includes the first signal output terminals 40 of each of the plurality of first POL power supplies 20 connected to a first signal input terminal 42 of the SoC device 22 via the first shared communications line 41. The SoC device 22 can determine, by monitoring the first signal input terminal 42, if any one of the first POL power supplies 20 is communicating the signal on the first shared communications line 41.

The first power supply circuit 10 includes a first pull-up resistor 44 connected between a first power node 46 and the first shared communications line 41. The first power node 46 has a predetermined voltage VIO, such as a positive direct current (DC) voltage, and the first pull-up resistor 44 functions to drive the first shared communications line 41 to a high-voltage state when no devices connected thereto are driving the first shared communications line 41 to the low-voltage state. The high-voltage state may include the first shared communications line 41 having a voltage above a predetermined high threshold voltage, indicating the signal being not present.

Each of the first POL power supplies 20 also includes a first field-effect transistor (FET) 50 arranged to selectively conduct a first current from the first signal output terminal 40 to the ground terminal 58, driving the first signal output terminal 40 to the low-voltage state, and thereby communicating the first signal. The first FET 50 defines a drain 52 connected to the first signal output terminal 40, and a source 54 connected to the ground terminal 58. The first FET 50 also has a gate 56.

Each of the first POL power supplies 20 also includes a first safety controller 60 having a signal output 62 connected to the gate 56 of the first FET 50 for selectively causing the first FET 50 to be in a conductive state, and thereby communicating the signal via the first signal output terminal 40.

Each of the first POL power supplies 20 also includes a first monitoring circuit 68 arranged to detect a status of the first signal output terminal 40 and to thereby determine whether an external device, outside of a given one of the first POL power supplies 20, is communicating the signal on the first shared communications line 41. The external device may include, for example, another one of the first POL power supplies 20 and/or an external monitoring device. The first monitoring circuit 68 includes a first buffer 70 having an input 72 connected to the first signal output terminal 40, and an output 74 connected to a first input 76 of the first safety controller 60. The first buffer 70 functions to drive the output 74 to a high-voltage condition in response to detecting the input 72 having the high-voltage condition, thereby providing for the first safety controller 60 to monitor a status of the first signal output terminal 40.

Figure 2:
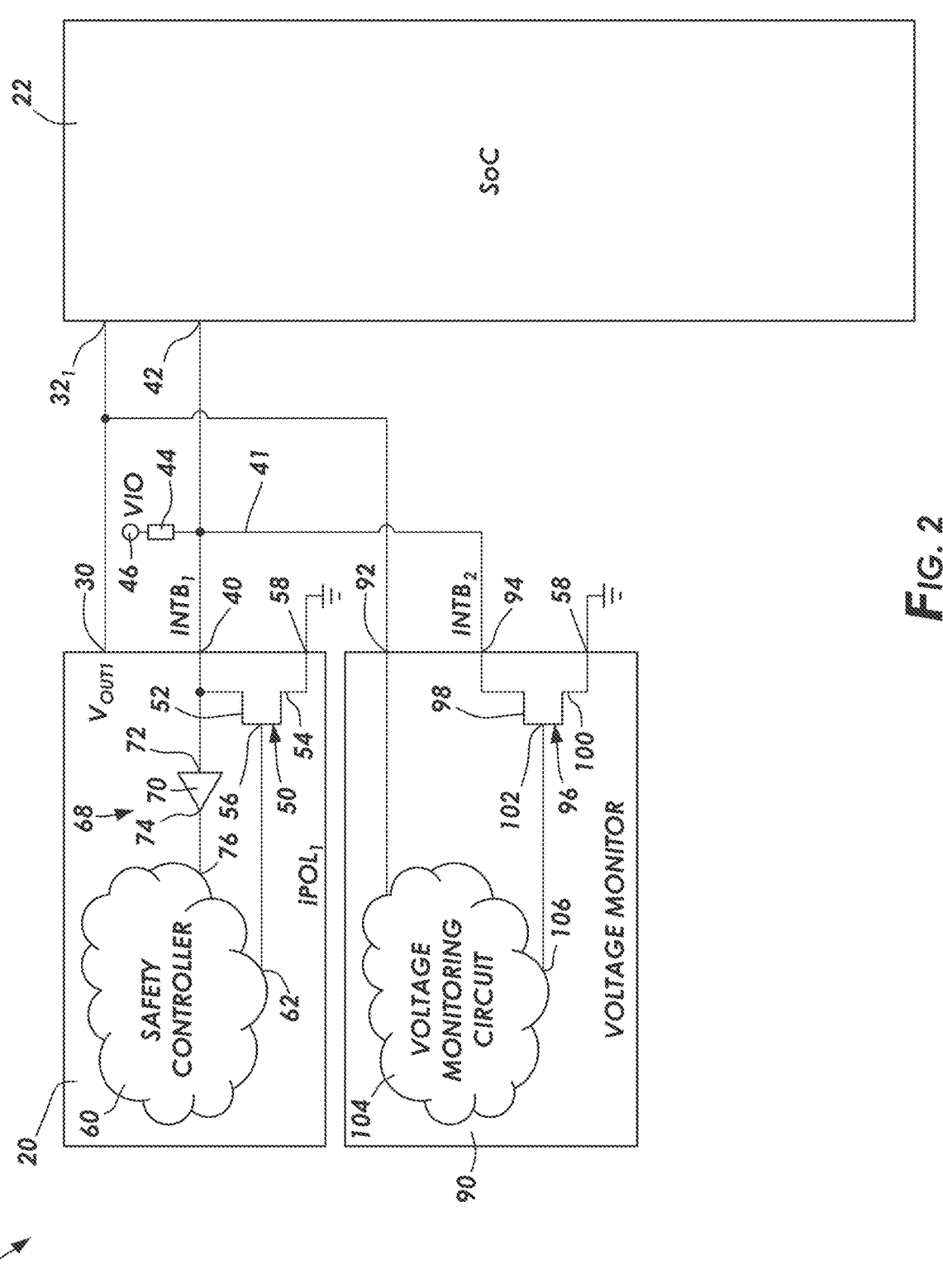
FIG. 2 shows an electrical schematic of a second power supply circuit including a first POL power supply device and a voltage monitor device, each connected to the SoC device.

FIG. 2 shows an electrical schematic of a second power supply circuit 80 including a first POL power supply 20 and an external voltage monitor 90 that is external to the first POL power supply 20. Each of the first POL power supply 20 and the external voltage monitor 90 are connected to the SoC device 22. The first POL power supply 20 may be similar or identical to the first POL power supplies 20 shown in FIG. 1, including a first signal output terminal 40 that is connected to a first signal input terminal 42 of the SoC device 22 via the first shared communications line 41.

The external voltage monitor 90 defines a monitoring terminal 92 that is connected to the power terminal 30 of a corresponding one of the first POL power supplies 20 for monitoring the corresponding output voltage $V_{OUT1}$. The external voltage monitor 90 also includes a second signal output terminal 94 that is connected to the first shared communications line 41, and a ground terminal 58.

The external voltage monitor 90 also includes a second FET 96 arranged to selectively conduct a current from the second signal output terminal 94 to the ground terminal 58, selectively driving the second signal output terminal 94 to the low-voltage state, and thereby communicating the first signal. The second FET 96 defines a drain 98 connected to the second signal output terminal 94, and a source 100 connected to the ground terminal 58. The second FET 96 also has a gate 102.

The external voltage monitor 90 includes a voltage monitoring circuit 104 connected to the monitoring terminal 92 and configured to monitor the corresponding output voltage $V_{OUT1}$. For example, the voltage monitoring circuit 104 may compare the corresponding output voltage $V_{OUT1}$ with one or more predetermined threshold voltages, such as a corresponding low operating voltage and/or a corresponding high operating voltage to determine if the corresponding output voltage $V_{OUT1}$ is within a given operating voltage range. The voltage monitoring circuit 104 includes a monitoring output 106 that is connected to the gate 102 of the second FET 96 for selectively causing the second FET 96 to be in a conductive state, and thereby communicating a signal via the second signal output terminal 94. For example, the external voltage monitor 90 may communicate the signal via the first shared communications line 41 and to the first signal input terminal 42 of the SoC device 22 in response to determining the corresponding output voltage $V_{OUT1}$ being outside of the given operating voltage range.

In some embodiments, and as shown in FIG. 2, the first monitoring circuit 68 of each of the first POL power supplies 20 may detect the first signal, generated by the external voltage monitor 90, on the first shared communications line 41. Each of the first POL power supplies 20 may be configured to take a corresponding action in response to detecting the signal on the first shared communications line 41.

Figure 3:
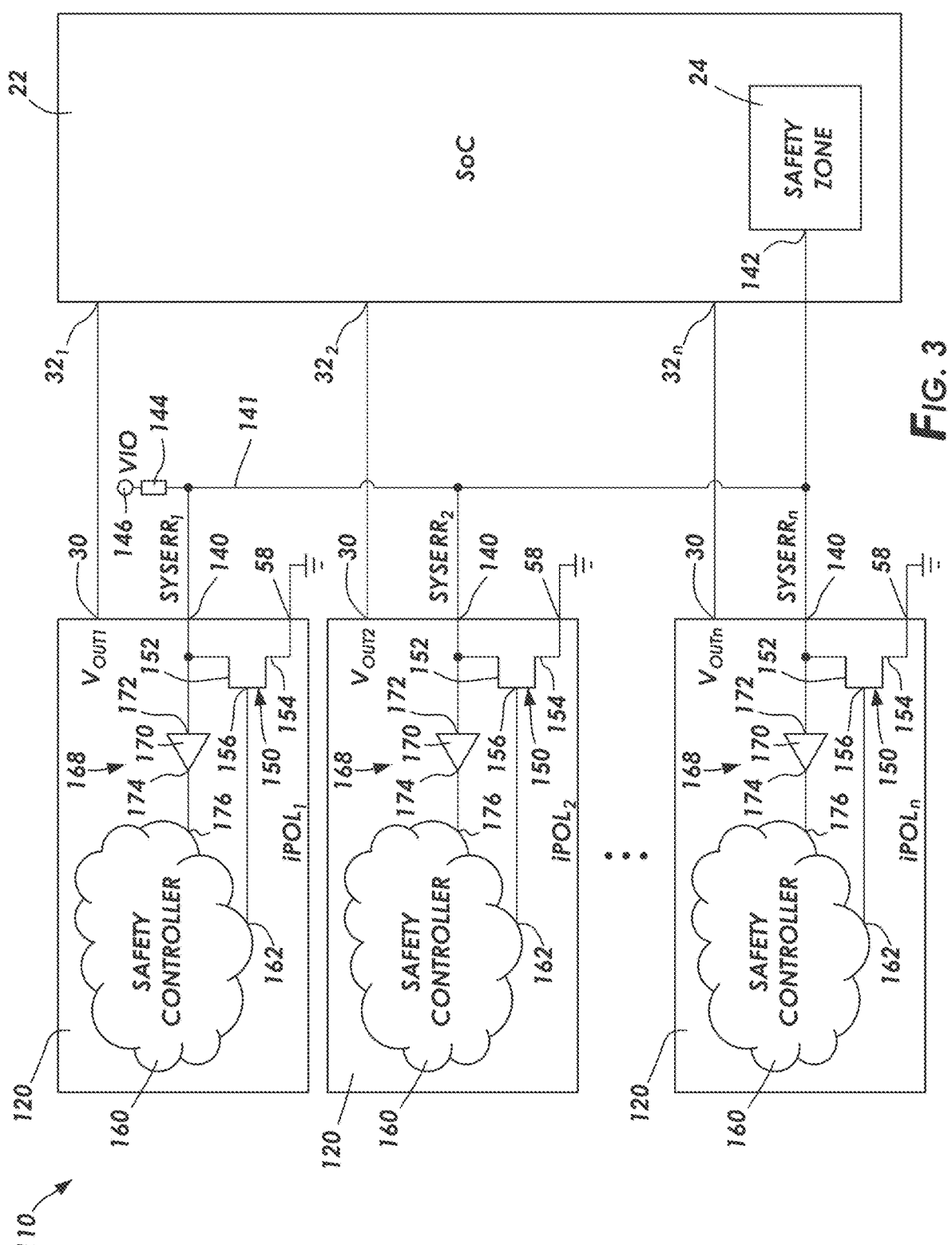
FIG. 3 shows an electrical schematic of a third power supply circuit including several second POL power supply devices each connected to the SoC device.

FIG. 3 shows a third power supply circuit 110 including several second POL power supplies 120 each connected to an SoC device 22. The third power supply circuit 110 provides safe state indicators from each of the second POL power supplies 120 and from the SoC device 22. The third power supply circuit 110 includes an open drain configuration to connect the plurality of second POL power supplies 120 to a second shared communications line 141.

Each of the second POL power supplies 120 includes a power terminal 30, and the second POL power supplies 120 are each configured to supply power to a load via a corresponding one of the output terminals 30 and at a corresponding voltage $V_{OUT1}$, $V_{OUT2}$, $V_{OUTN}$. The output terminals 30 of the second POL power supplies 120 are each connected to a corresponding power input terminal $32_1$, $32_2$, $32_n$ of the SoC device 22 for supplying power thereto.

Each of the second POL power supplies 120 also includes a third signal output terminal 140, and the second POL power supplies 120 are each configured to selectively conduct current between the third signal output terminal 140 and a ground terminal 58 having a ground potential for selectively driving the second shared communications line 141 to a low-voltage state, and thereby communicating a signal to the SoC device 22. The signal communicated on the second shared communications line 141 may include a platform safe state signal, which may be designated SYS-ERR1, SYSERR2, . . . SYSERRn.

The third power supply circuit 110 includes the third signal output terminals 140 of each of the plurality of second POL power supplies 120 connected to a safety signal input 142 of a safety zone 24 within the SoC device 22 via the second shared communications line 141. Each of the second POL power supplies 120 can, thus, determine, using the third signal output terminal 140, if any one of the second POL power supplies 120 and/or the safety zone 24 is communicating the signal on the second shared communications line 141. The safety zone 24 may include safety-specific circuitry, such as one or more dedicated processing cores, configured to monitor one or more parameters of the system and to communicate the signal, which may also be called a safe state signal, in response to detecting an error condition, such as one or more parameters of the system deviating from corresponding specified values. The SoC device 22 and/or the second POL power supplies 120 may each be configured to take a corresponding self-governing action in response to the safe state signal. For example, one or more of the second POL power supplies 120 may be configured to stop supplying power on its corresponding power terminal 30 in response to the safe state signal and to set the system in a safe state. In some embodiments, and as shown in FIG. 3, the safety zone 24 may be located within a load device, such as the SoC device 22, which receives power from the second POL power supplies 120. However, in other embodiments, the safety zone 24 may be implemented in another device, such as another SoC that does not receive power from the second POL power supplies 120 or a safety controller that is separate from the SoC device 22.

The third power supply circuit 110 includes a second pull-up resistor 144 connected between a second power node 146 and the second shared communications line 141. The second power node 146 has a predetermined voltage VIO and the second pull-up resistor 144 functions to drive the second shared communications line 141 to a high-voltage state when none of the second POL power supplies 120 or the safety zone 24 of the SoC device 22 are driving the second shared communications line 141 to the low-voltage state.

Each of the second POL power supplies 120 also includes a third FET 150 arranged to selectively conduct a second current from the third signal output terminal 140 to the ground terminal 58, selectively driving the third signal output terminal 140 to the low-voltage state, and thereby communicating the signal on the second shared communications line 141. The third FET 150 defines a drain 152 connected to the third signal output terminal 140, and a source 154 connected to the ground terminal 58. The third FET 150 also has a gate 156.

Each of the second POL power supplies 120 also includes a second safety controller 160 having a signal output 162 connected to the gate 156 of the third FET 150 for selectively causing the third FET 150 to be in a conductive state, and thereby communicating the signal on the second shared communications line 141, via the third signal output terminal 140.

Each of the second POL power supplies 120 also includes a second monitoring circuit 168 arranged to detect a status of the third signal output terminal 140 and to thereby determine whether an external device, outside of a given one of the second POL power supplies 120, is communicating the signal on the second shared communications line 141. The external device may include, for example, another one of the second POL power supplies 120, an external monitoring device, and/or the safety zone 24 within the SoC device 22. The second monitoring circuit 168 includes a second buffer 170 having an input 172 connected to the third signal output terminal 140, and an output 174 connected to a second input 176 of the second safety controller 160. The second buffer 170 functions to drive the output 174 to a high-voltage condition in response to detecting the input 172 having the high-voltage condition, thereby providing for the second safety controller 160 to monitor a status of the third signal output terminal 140.

The signal communicated on the second shared communications line 141 may include a safe state signal regarding a platform safe state, and each of the of the second POL power supplies 120 may be configured to take a self-governing action, such as entering a safe state condition, in response to the safe state signal. Thus, the third power supply circuit 110 provides information about a platform safe state to each of third of the second POL power supplies 120, and from each of the second POL power supplies 120 and/or from the SoC device 22, enabling the second POL power supplies 120 to immediately take appropriate self-governing actions, and without any interaction by the SoC device 22 or any other central controller.

Figure 4:
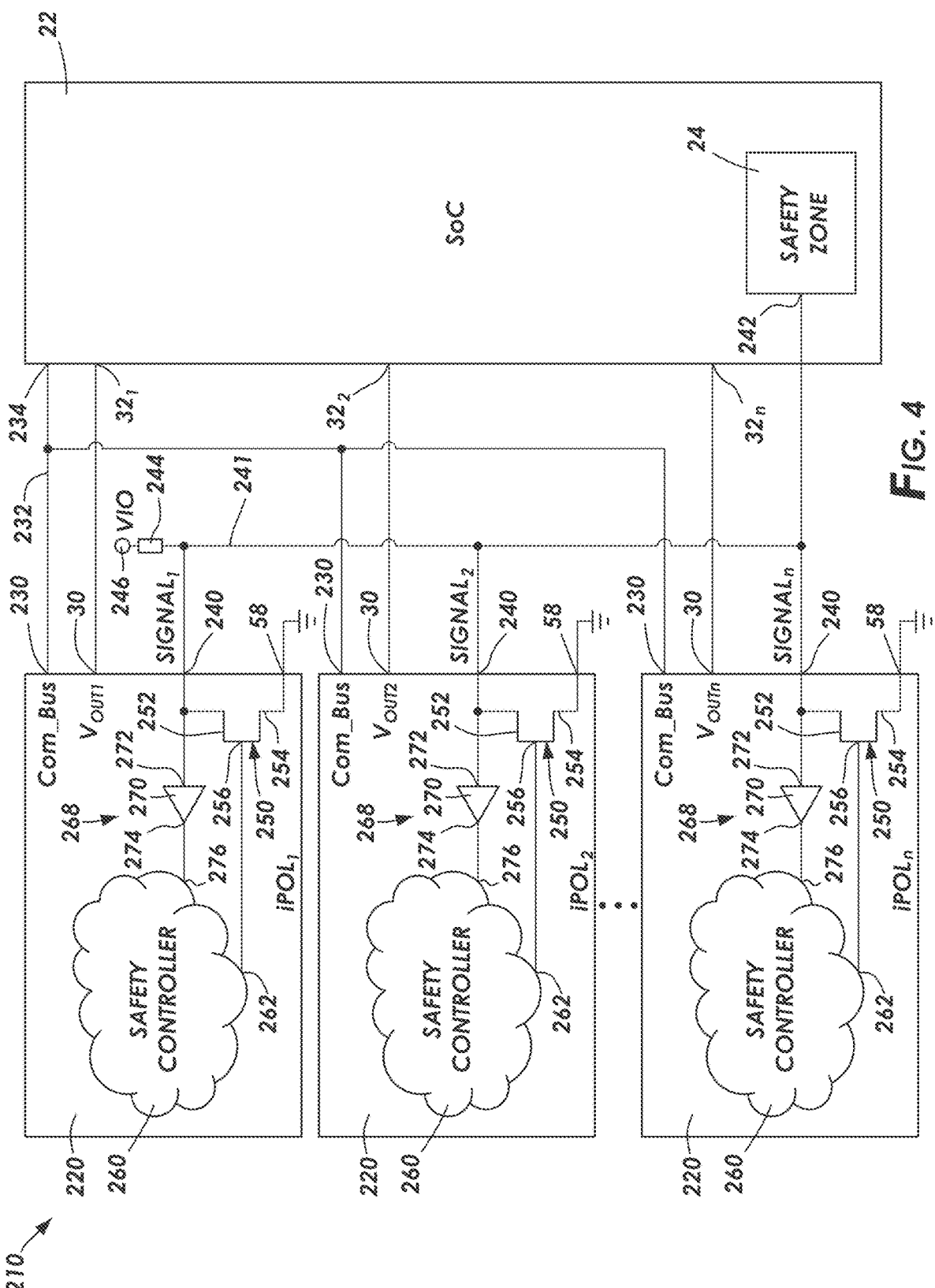
FIG. 4 shows an electrical schematic of a fourth power supply circuit including several third POL power supply devices each connected to the SoC device and to a communications bus.

FIG. 4 shows an electrical schematic of a fourth power supply circuit 210 including several third POL power supplies 220 each connected to an SoC device 22. The fourth power supply circuit 210 provides a communications status signal regarding a message on a communications bus between each of the third POL power supplies 220 and the SoC device 22. The fourth power supply circuit 210 includes an open drain configuration to connect the plurality of third POL power supplies 220 to a third shared communications line 241.

Each of the third POL power supplies 220 includes a power terminal 30, and the third POL power supplies 220 are each configured to supply power to a load via a corresponding one of the output terminals 30 and at a corresponding voltage $V_{OUT1}$, $V_{OUT2}$, $V_{OUTN}$. The output terminals 30 of the third POL power supplies 220 are each connected to a corresponding power input terminal $32_1$, $32_2$, $32_n$ of the SoC device 22 for supplying power thereto.

Each of the third POL power supplies 220 includes a first communications terminal 230 connected to a communications bus 232 and to a second communications terminal 234 of the SoC device 22. Each of the third POL power supplies 220 is configured to send one or messages on the shared communications bus 232, such as status messages for receipt by the SoC device 22 and/or one or more other ones of the third POL power supplies 220.

Each of the third POL power supplies 220 also includes a fourth signal output terminal 240, and the third POL power supplies 220 are each configured to selectively conduct current between the fourth signal output terminal 240 and a ground terminal 58 having a ground potential for selectively driving the third shared communications line 241 to a low-voltage state, and thereby communicating a signal to the SoC device 22. The signal communicated on the third shared communications line 241 may include a communications status signal regarding the message on the communications bus 232, and which may be designated SIGNAL1, SIGNAL2, . . . SIGNALn.

The fourth power supply circuit 210 includes the fourth signal output 240 of each of the plurality of third POL power supplies 220 connected to a signal input/output terminal 242 of a safety zone 24 within the SoC device 22, via the third shared communications line 241. Each of the third POL power supplies 220 can, thus, determine, using the fourth signal output terminal 240, if any one of the third POL power supplies 220 and/or the SoC device 22 is communicating the signal on the third shared communications line 241.

The fourth power supply circuit 210 includes a third pull-up resistor 244 connected between a third power node 246 and the third shared communications line 241. The third power node 246 has a predetermined voltage VIO and the third pull-up resistor 244 functions to drive the third shared communications line 241 to a high-voltage state when none of the third POL power supplies 220 or the safety zone 24 of the SoC device 22 are driving the third shared communications line 241 to the low-voltage state.

Each of the third POL power supplies 220 also includes a fourth FET 250 arranged to selectively conduct a third current from the fourth signal output terminal 240 to the ground terminal 58, selectively driving the fourth signal output terminal 240 to the low-voltage state, and thereby communicating the signal on the third shared communications line 241. The fourth FET 250 defines a drain 252 connected to the fourth signal output terminal 240, and a source 254 connected to the ground terminal 58. The fourth FET 250 also has a gate 256.

Each of the third POL power supplies 220 also includes a third safety controller 260 having a signal output 262 connected to the gate 256 of the fourth FET 250 for selectively causing the fourth FET 250 to be in a conductive state, and thereby communicating the signal via the fourth signal output terminal 240.

Each of the third POL power supplies 220 also includes a third monitoring circuit 268 arranged to detect a status of the fourth signal output terminal 240 and to thereby determine whether an external device, outside of a given one of the third POL power supplies 220, is communicating the signal on the third shared communications line 241. The external device may include, for example, another one of the third POL power supplies 220, an external monitoring device, and/or the safety zone 24 within the SoC device 22. The third monitoring circuit 268 includes a third buffer 270 having an input 272 connected to the fourth signal output terminal 240, and an output 274 connected to a third input 276 of the third safety controller 260. The third buffer 270 functions to drive the output 274 to a high-voltage condition in response to detecting the input 272 having the high-voltage condition, thereby providing for the third safety controller 260 to monitor a status of the fourth signal output terminal 240.

The signal communicated on the third shared communications line 241 may indicate the corresponding one of the third POL power supplies 220 being approved to communicate on the communications bus 232. From the moment one of the third POL power supplies 220 drives its fourth signal output terminal 240 to the low-voltage state, thereby communicating the signal on the third shared communications line 241, that one of the third POL power supplies 220 becomes a primary communicator and starts to transmit on the communications bus 232. Upon detecting the signal on the third shared communications line 241, other devices become subordinate and listen to the communications bus 232, but do not send messages on the communications bus 232.

FIG. 5 shows a flow chart listing steps in a method of operating a point of load (POL) power supply in accordance with at least some embodiments. In particular, the method starts (block 400) and comprises: supplying power to a load via a power terminal (block 402).

The method also includes selectively conducting, by a field-effect transistor (FET) of the POL power supply, a current between a signal output terminal of the POL power supply device and a ground terminal of the POL power supply to drive the signal output terminal to a low-voltage state, thereby communicating a signal (block 404).

The method also includes detecting, by a monitoring circuit of the POL power supply, a status of the signal output terminal to determine whether an external device is communicating the signal on a shared communications line connected to the signal output terminal (block 406).

In some embodiments, the method may further include detecting an error condition, and the signal may include an interrupt signal indicating the error condition.

In some embodiments, the signal may include a safe state signal regarding a platform safe state. The POL power supply may be configured to take a self-governing action in response to the safe state signal.

In some embodiments, the method may further include sending, by the POL power supply, a message on a communications bus connected thereto, and the signal may include a communications status signal regarding sending the message on the communications bus.

In some embodiments, the method may further include conducting, by an external pull-up resistor, current from an energized node to the shared communications line for driving the shared communications line to a high-voltage state with the FET in a non-conductive state. The open drain signaling technique may include both selectively driving the shared communications line to the low-voltage state by a FET, as performed at block 404, and driving the shared communications line to the high-voltage state with the FET in a non-conductive state.

The systems and methods of the present disclosure provide for simple communication between POL power supplies, without any specific bus communication.

The systems and methods of the present disclosure include POL power supplies with a sense back of the open drain's output. Thus, a state machine within each of the POL power supplies can know immediately if one or more of other POL power supplies connected to the line drives it low, and so react accordingly.

The systems and methods of the present disclosure provide a simple communication between the POL power supplies maintaining the safety level of the platform without any specific external controller. In case of a "safe state open drain" indicator, such as INTB or SYSERR pins, which may be connected to a safety MCU (not shown in the Figures), this provides information about a platform safe state to each of the POL power supplies, which can then take appropriate actions immediately.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power supply circuit, comprising:
a first of point of load (POL) power supply having a first power terminal configured to define a first output voltage for supplying power to a first load, the first POL power supply including a first field-effect transistor (FET) defining a drain connected to a first signal output terminal of the first POL power supply, and a source connected to a first ground terminal of the first POL power supply, the first FET configured to selectively conduct a current between the first signal output terminal and the first ground terminal to drive the first signal output terminal to a low-voltage state, thereby communicating a signal;
a second POL power supply having a second power terminal configured to define a second output voltage for supplying power to a second load, the second POL power supply including a second FET defining a drain connected to a second signal output terminal of the second POL power supply, and a source connected to a second ground terminal of the second POL power supply, the second FET configured to selectively conduct a current between the second signal output terminal and the second ground terminal to drive the second signal output terminal to a low-voltage state, thereby communicating the signal; and
a load device including a first power input terminal connected to the first power terminal of the first POL power supply, a second power input terminal connected to the second power terminal of the second POL power supply, and a signal input terminal connected to each of the first signal output terminal of the first POL power supply and the second signal output terminal of the second POL power supply via a shared communications line, and
wherein the first POL power supply further includes a monitoring circuit connected to the first signal output terminal and configured to detect a status of the first signal output terminal to determine whether an external device is communicating the signal on the shared communications line.

2. The power supply circuit of claim 1, wherein the load device includes a System- on-Chip (SoC) device.

3. The power supply circuit of claim 1, wherein the external device includes the second POL power supply.

4. The power supply circuit of claim 1, wherein the first POL power supply is configured to detect an error condition, and wherein the signal includes an interrupt signal indicating the error condition.

5. The power supply circuit of claim 1, wherein the signal includes a safe state signal regarding a platform safe state, and
wherein the first POL power supply is configured to take a self-governing action in response to the safe state signal.

6. The power supply circuit of claim 5, further including a safety zone defining a safety signal output connected to the shared communications line and configured to selectively communicate the safe state signal to each of the first POL power supply and the second POL power supply.

7. The power supply circuit of claim 6, wherein the safety zone is located within the load device.

8. The power supply circuit of claim 1, further comprising a communications bus connected to each of the first POL power supply, the second POL power supply, and the load device,
wherein the first POL power supply is configured to send a message on the communications bus; and
wherein the signal includes a communications status signal regarding the message on the communications bus.

9. The power supply circuit of claim 1, further comprising an external pull-up resistor connected between an energized node and the shared communications line for driving the shared communications line to a high-voltage state with each of the first FET and the second FET in a non-conductive state.

10. The power supply circuit of claim 1, wherein the external device includes a monitor device configured to monitor at least one of a voltage or a current of the power supplied to the first load.

11. The power supply circuit of claim 10, wherein the monitor device includes an external voltage monitor that is external to the first POL power supply and configured to monitor the first output voltage of the first power terminal.

12. A power supply circuit, comprising:
a first of point of load (POL) power supply having a first power terminal configured to define a first output voltage for supplying power to a first load, the first POL power supply including a first field-effect transistor (FET) defining a drain connected to a first signal output terminal of the first POL power supply, and a source connected to a first ground terminal of the first POL power supply, the first FET configured to selectively conduct a current between the first signal output terminal and the first ground terminal to drive the first signal output terminal to a low-voltage state, thereby communicating a signal; and
a second POL power supply having a second power terminal configured to define a second output voltage for supplying power to a second load, the second POL power supply including a second FET defining a drain connected to a second signal output terminal of the second POL power supply, and a source connected to a second ground terminal of the second POL power supply, the second FET configured to selectively conduct a current between the second signal output terminal and the second ground terminal to drive the second signal output terminal to a low-voltage state, thereby communicating the signal,
wherein the first signal output terminal of the first POL power supply and the second signal output terminal of the second POL power supply are each connected to a shared communications line, and wherein the first POL power supply further includes a monitoring circuit connected to the first signal output terminal and configured to detect a status of the first signal output terminal to determine whether an external device is communicating the signal on the shared communications line.

13. The power supply circuit of claim 12, further comprising:

a load device including a first power input terminal connected to the first power terminal of the first POL power supply, a second power input terminal connected to the second power terminal of the second POL power supply, and a signal input terminal connected to each of the first signal output terminal of the first POL power supply and the second signal output terminal of the second POL power supply via the shared communications line.

14. The power supply circuit of claim 12, wherein the first POL power supply is configured to detect an error condition, and wherein the signal includes an interrupt signal indicating the error condition.

15. The power supply circuit of claim 12, wherein the signal includes a safe state signal regarding a platform safe state, and wherein the first POL power supply is configured to take a self-governing action in response to the safe state signal.

16. The power supply circuit of claim 15, further including a safety zone defining a safety signal output connected to the shared communications line and configured to selec-tively communicate the safe state signal to each of the first POL power supply and the second POL power supply.

17. The power supply circuit of claim 16, further comprising: a load device including a first power input terminal connected to the first power terminal of the first POL power supply, a second power input terminal connected to the second power terminal of the second POL power supply, and a signal input terminal connected to each of the first signal output terminal of the first POL power supply and the second signal output terminal of the second POL power supply via the shared communications line, wherein the safety zone is located within the load device.

18. The power supply circuit of claim 12, further comprising a communications bus connected to each of the first POL power supply, and the second POL power supply, wherein the first POL power supply is configured to send a message on the communications bus; and wherein the signal includes a communications status signal regarding the message on the communications bus.

19. The power supply circuit of claim 12, further comprising an external pull-up resistor connected between an energized node and the shared communications line for driving the shared communications line to a high-voltage state with each of the first FET and the second FET in a non-conductive state.

20. The power supply circuit of claim 12, wherein the external device includes a monitor device configured to monitor at least one of a voltage or a current of the power supplied to the first load.

* * * * *